United States Patent
Gine Elies et al.

(10) Patent No.: US 12,522,157 B2
(45) Date of Patent: Jan. 13, 2026

(54) ELECTRICAL SYSTEM

(71) Applicant: Lear Corporation, Southfield, MI (US)

(72) Inventors: Julia Gine Elies, Valls (ES); Youssef Ghabbour, Valls (ES); Ivan Casado Garcia, Valls (ES); Marc Ferrer Duran, Valls (ES); Roser Rue Olive, Valls (ES); Cesar Ruano Alvarez, Valls (ES); Luis Roda Cornejo, Valls (ES)

(73) Assignee: Lear Corporation, Southfield, MI (US)

( * ) Notice: Subject to any disclaimer, the term of this patent is extended or adjusted under 35 U.S.C. 154(b) by 219 days.

(21) Appl. No.: 18/099,495

(22) Filed: Jan. 20, 2023

(65) Prior Publication Data

US 2024/0246497 A1 Jul. 25, 2024

(51) Int. Cl.
*H02M 3/335* (2006.01)
*B60R 16/02* (2006.01)

(52) U.S. Cl.
CPC ............. *B60R 16/02* (2013.01); *H02M 3/335* (2013.01)

(58) Field of Classification Search
CPC .......... H02M 7/42; H02M 7/48; H02M 7/487; H02M 7/493; H02M 7/501; H02M 7/4826; H02M 7/49; H02M 7/4807; H02M 7/537; H02M 7/5387; H02M 7/533; H02M 7/53; H02M 7/53871
See application file for complete search history.

(56) References Cited

U.S. PATENT DOCUMENTS

| | | | |
|---|---|---|---|
| 5,804,973 A * | 9/1998 | Shinohara | B60L 50/60 324/548 |
| 9,923,470 B2 | 3/2018 | Jimenez Pino | |
| 9,925,878 B2 | 3/2018 | Hashim | |
| 2013/0250641 A1 * | 9/2013 | Falk | H10F 77/955 363/131 |
| 2015/0084404 A1 | 3/2015 | Hashim | |
| 2015/0251542 A1 * | 9/2015 | Mensah-Brown | B60L 50/40 307/10.1 |
| 2017/0133837 A1 | 5/2017 | Hasan | |
| 2018/0043783 A1 * | 2/2018 | Tabatowski-Bush | B60L 1/00 |
| 2019/0393801 A1 * | 12/2019 | Agirman | H02P 27/08 |

OTHER PUBLICATIONS

Ozguc et al., Comprehensive Analysis of Pre-Charge Sequence in Automotive Battery Systems, Software&Electronics, AVL Research & Engineering, Istanbul, Turkey, Transactions on Environment and Electrical Engineering ISSN 2450-5730 vol. 4, No. 1 (2020).
Voltage Control of Chopper—Time Ratio & Current Limit Control, https://www.electronicsmind.com/voltage-control-of-chopper/Feb. 25, 2022.

* cited by examiner

*Primary Examiner* — Bryan R Perez
(74) *Attorney, Agent, or Firm* — Fishman Stewart PLLC (57) ABSTRACT

A system includes a power source, a capacitor, a precharge circuit, and/or a controller, in some configurations. The capacitor may be electrically connected to the power source. The precharge circuit may be electrically connected between the power source and the capacitor. The precharge circuit may include a switch connected in parallel with a resistor. The controller may be electrically connected to the power source and the precharge circuit. The controller may conduct a first precharging of the capacitor to a first voltage via the resistor. The controller may conduct a second precharging of the capacitor from the first voltage to a second voltage via the switch.

19 Claims, 5 Drawing Sheets

ELECTRICAL SYSTEM

TECHNICAL FIELD

The present disclosure generally relates to electrical systems, including capacitors and/or precharge circuits that may, for example, be utilized in connection with and/or incorporated in vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
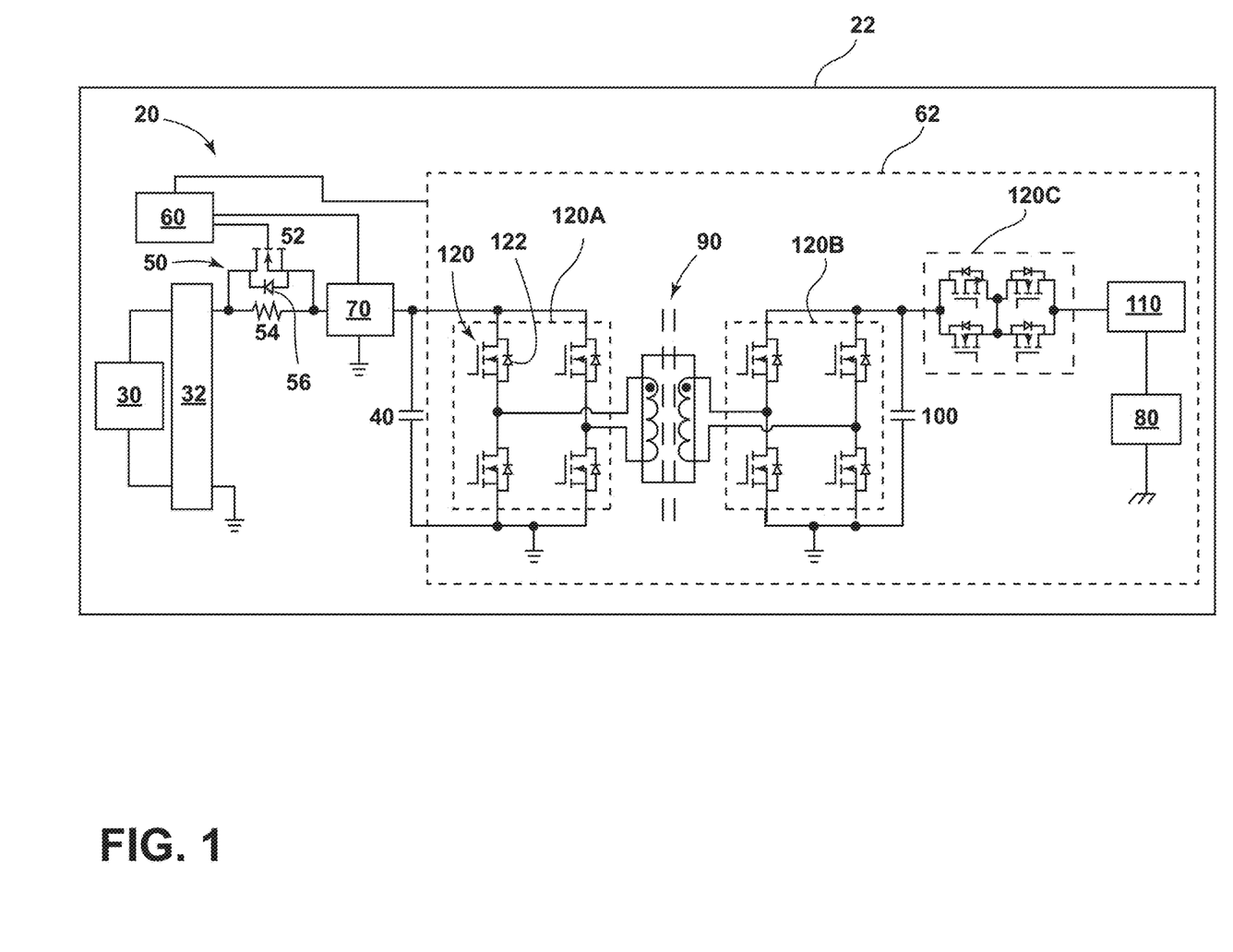
FIG. 1 is a schematic view generally illustrating an embodiment of an electrical system according to teachings of the present disclosure.

FIG. 1 presents an electrical system 20 including a power source 30, a capacitor 40, a precharge circuit 50, a controller 60, a load 62, and one or more sensors 70. The capacitor 40 is electrically connected to the power source 30 via the precharge circuit 50. The precharge circuit 50 is disposed between the power source 30 and the capacitor 40. In some example configurations, the precharge circuit 50 includes a switch 52 connected in parallel with a resistor 54. The controller 60 is electrically connected to the precharge circuit 50 (e.g., the switch 52) and the one or more sensors 70. The controller 60 is configured to conduct a first precharging of the capacitor 40 to a first voltage via the resistor 54 and is configured to conduct a second precharging of the capacitor 40 from the first voltage to a second voltage via the switch 52. The first voltage is less than the second voltage. The first voltage may include a voltage that is less than a voltage of the power source 30 and/or the second voltage may include a voltage that corresponds to the voltage of the power source 30. The precharging of the capacitor 40 increases the voltage at the capacitor 40 to limit and/or prevent current peaks (e.g., inrush current, overcurrent, etc.), such as when the switch 52 is closed and kept closed. A filter 32 may be connected between the power source 30 and the precharge circuit 50. Optionally, the capacitor 40 is connected to the power source 30 exclusively via the precharge circuit 50 (e.g., there may not be a parallel connection between the power source 30 and the capacitor 40 that bypasses the precharge circuit 50).

In some implementations, an electrical system 20 may be incorporated with and/or disposed in a vehicle 22 but is not limited to vehicle applications. A vehicle 22 may include one or more of a variety of configurations. For example and without limitation, a vehicle 22 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air and water, etc.), among others.

With continued reference to FIG. 1, the electrical system 20 includes one or more sensors 70. In some examples, the sensors 70 are configured to measure electrical current and/or voltage provided via the power source 30. The sensors 70 are electrically connected to the power source 30, the precharge circuit 50, and/or the capacitor 40. The sensors 70 are disposed between the precharge circuit 50 and the capacitor 40. In some example configurations, the sensors 70 are connected to ground such that the sensors 70, in combination with the resistor 54, function as a voltage divider which causes the first voltage to be less than the second voltage and/or less than a voltage of the power source 30 during the first precharging of the capacitor 40. The second precharging of the capacitor 40 increase the voltage at the capacitor 40 above the first voltage to the second voltage, which corresponds to a voltage of the power source 30.

In some example configurations, such as when a load 62 includes at least portions of a DC-DC converter, a load 62 of the electrical system 20 includes a second power source 80, a transformer 90, a second capacitor 100, one or more additional sensors and/or a filter 110, and/or a plurality of switches 120. The plurality of switches 120 may include a first plurality of switches 120A, a second plurality of switches 120B, and/or a third plurality of switches 120C.

With embodiments, a power source 30, 80 may include one or more of a variety of configurations. For example and without limitation, a power source 30, 80 may include a battery, a capacitor, a solar panel, a power converter, and/or an outlet, among others. In some implementations, a power source 30 is configured to provide a high voltage and/or a second power source 80 is configured to provide a low voltage. In some examples, a power source 30 provides a voltage of at least 200 V. In other examples, a power source 30 provides a voltage of at least 800 V. The second power source 80 may, for example and without limitation, provide a voltage of 100 V or less (e.g., 12 V, 24 V, 48 V, among others).

In embodiments, a switch 52, 120 may include an electrical switch. For example and without limitation, a switch 52, 120 may include a transistor, a field effect transistor (FET), a metal oxide semiconductor field effect transistor (MOSFET), such as n-channel or p-channel MOSFET, a bipolar junction transistor (BJT), and/or a smart FET, among others. In some examples, a switch 52, 120 includes a diode 56, 122. A diode 56, 122 may be a body/intrinsic/parasitic diode. In some example configurations, a controller (e.g., controller 60) may communicate with and/or control a switch 52, 120 such as to activate and/or deactivate (e.g., close/open) the switch 52, 120.

Figure 2A:
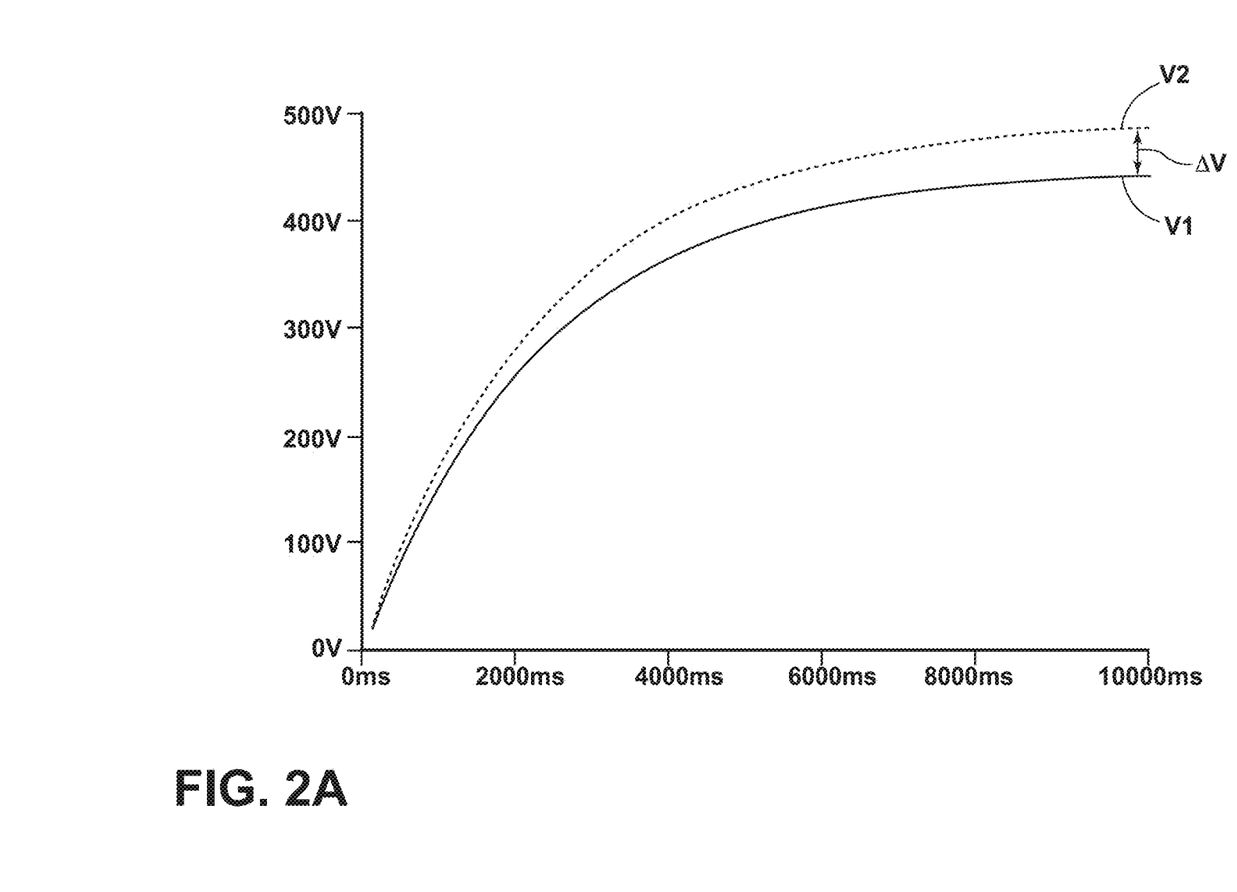
FIG. 2A is a graphical representation generally illustrating voltage at a capacitor associated with a first precharging of an embodiment an electrical system and corresponding according to teachings of the present disclosure.

With embodiments, the electrical system 20 may include and/or may be utilized in connection with a converter (e.g., a DC-DC converter). During operation of the electrical system 20 (e.g., at a start of operating the converter), it may be desirable to precharge the capacitor 40 to avoid electrical current peaks that may be caused in connection charging the capacitor 40. Referring to FIG. 2A, with a single precharging, the voltage at the capacitor 40 may be increased to a first voltage V1, but may be less than the second/desired voltage by a voltage difference ΔV. The voltage difference ΔV may be caused by the sensors 70 and the resistor 54 effectively acting as a voltage divider. The voltage difference ΔV could result in a current peak when the switch 52 is kept on as large currents may be provided to the capacitor 40 to increase the voltage from the first voltage V1 to the second voltage V2. In some examples, the voltage difference ΔV between the first voltage V1 and the second voltage V2 is about 5%-15% of the second voltage V2.

Figure 2B:
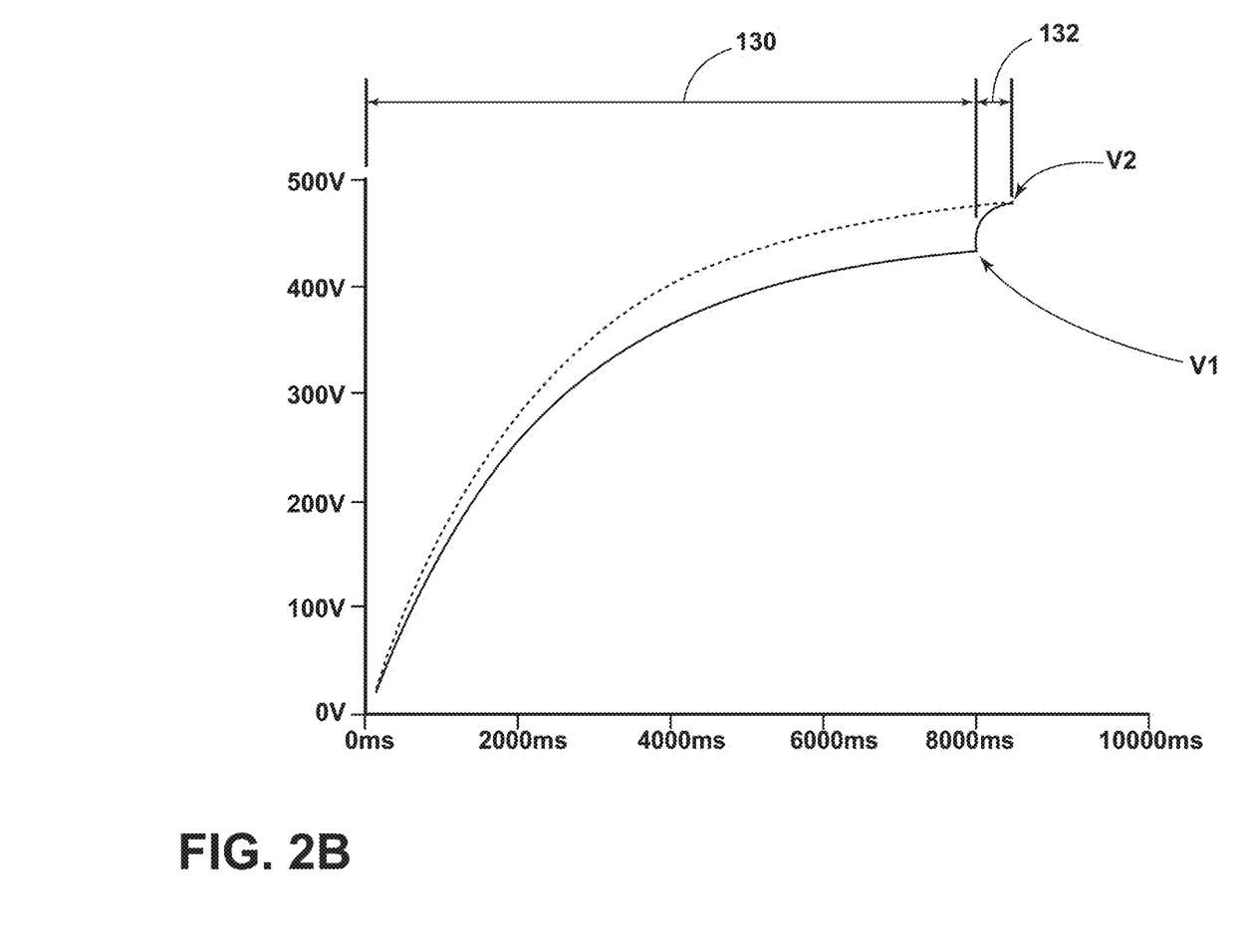
FIG. 2B is a graphical representation generally illustrating voltage at a capacitor associated with a first precharging and a second precharging of an embodiment an electrical system and corresponding according to teachings of the present disclosure.

The system 20 is configured to conduct a second precharging to eliminate, minimize, and/or reduce the voltage difference ΔV, which may eliminate, minimize, and/or reduce current peaks. Referring now to FIG. 2B, in some instances, the second precharging may increase the voltage at the capacitor 40 from the first voltage (e.g., approximately 425 V) to the second/desired voltage V2 (e.g., approximately 475 V). The controller 60 may control the precharge circuit 50 to conduct the first precharging to increase the voltage at the capacitor 40 to the first voltage V1 and may control the precharge circuit 50 to conduct the second precharging to compensate for the voltage difference ΔV and increase the voltage at the capacitor 40 to the second/desired voltage V2.

Figure 3:
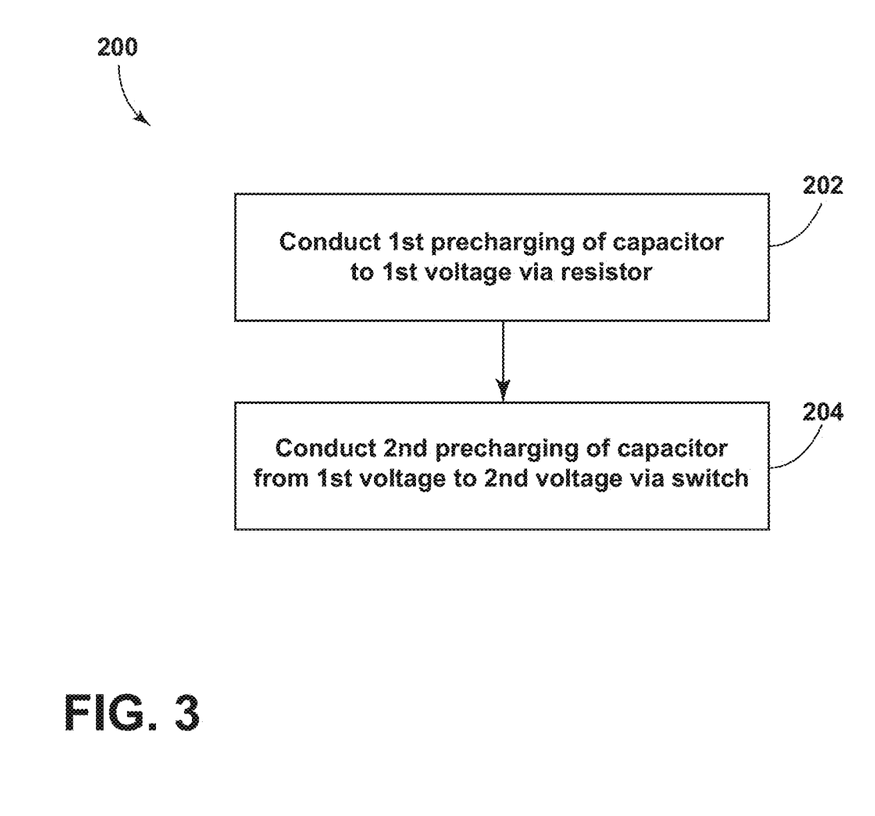
FIG. 3 is a flow diagram generally illustrating an embodiment of a method of operating an electrical system according to teaching of the present disclosure.

FIG. 3 presents a method 200 of operating the electrical system 20. The method 200 includes the controller 60 conducting a first precharging of the capacitor 40 to a first voltage V1 via the resistor 54 of the precharge circuit 50 (block 202). During the first precharging, the switch 52 of the precharge circuit 50 is open such that electrical current flows from the power source 30 through the resistor 54 to the capacitor 40 and not through the switch 52. The first precharging is conducted for a predetermined period, for example and without limitation, approximately 5 seconds to 11 seconds (e.g., about 8 seconds). During the first precharging, the sensors 70 and the resistor 54 may act as a voltage divider, reducing/limiting the voltage increase at the capacitor 40.

The method 200 includes the controller 60 conducting a second precharging of the capacitor 40 from the first voltage V1 to a second voltage V2 via the switch 52 of the precharge circuit 50 (block 204). In some instances, if the switch 52 is closed for extended periods, electrical current flows from the power source 30 through the switch 52 and to the capacitor 40, while bypassing the resistor 54, which may expose the capacitor 40 to undesirable current peaks. To avoid/limit exposure to the current peaks, the controller 60 is configured to provide a pulse width modulation (PWM) signal to the switch 52 to repeatedly open and close the switch 52, which increases the voltage at the capacitor 40 while limiting maximum current.

Figure 4:
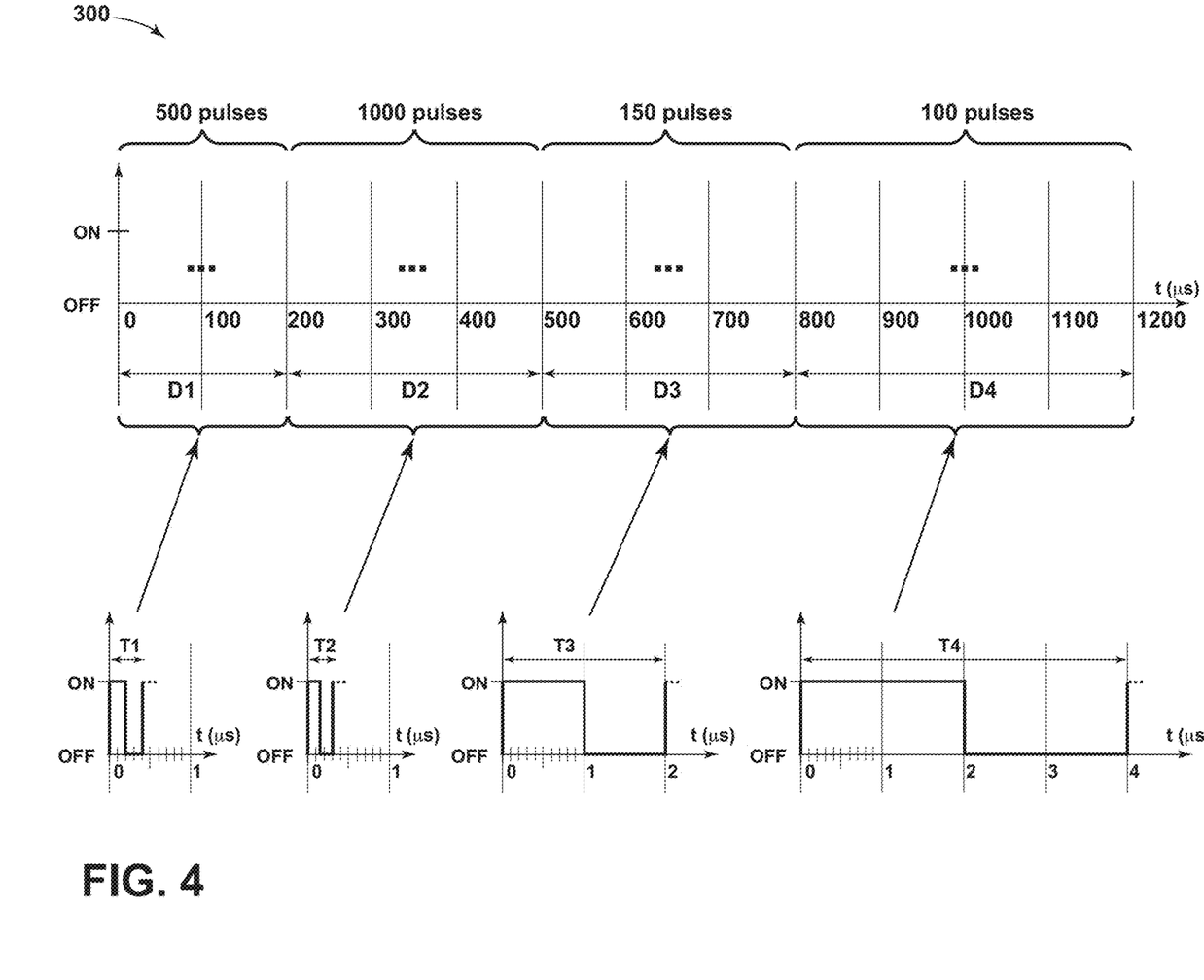
FIG. 4 is a graphical representation generally illustrating portions of a control signal provided by a controller of an embodiment of an electrical system according to teachings of the present disclosure.

With reference to FIG. 4, one example of a PWM signal 300 that may be provided by a controller 60 to control the switch 52 during the second precharging includes a plurality of different periods such as a first period T1, a second period T2, a third period T3, and/or a fourth period T4. In some implementations, the fourth period T4 is longer than the first period T1, the second period T2, and/or the third period T3; the third period T3 is longer than the first period T1 and the second period T2; and/or the second period T2 is shorter than the first period T1. In some examples, the fourth period T4 is at least five times longer the first period T1 and the second period T2. In some instances, the first period T1, the second period T2, the third period T3, and/or the fourth period T4 are 5 us or less. The first period T1 and the second period T2 are 1 us or less. In some embodiments, the PWM signal 300 includes a duty cycle of 60% or less (e.g., 50%).

In some examples, the PWM signal 300 includes the first period T1 for a first duration D1, the second period T2 for a second duration D2, the third period T3 for a third duration D3, and/or the fourth period T4 for a fourth duration D4. For example and without limitation, the first duration D1 may include about 500 pulses of the first period T1, the second duration D2 may include about 1000 pulses of the second period T2, the third duration D3 may include about 150 pulses of the third period T3, and/or the fourth duration D4 may include about 100 pulses of the fourth period T4. In some instances, the first duration D1 is shorter than the fourth duration D4. In some implementations, the first duration D1, the second duration D2, the third duration D3, and/or the fourth duration D4 are 500 us or less. In some instances, the length 132 of the second precharging is significantly shorter than the length 130 of the first precharging, such as about 0.1% or less (e.g., 0.02% or less) than length 130 of the first precharging. For example and without limitation, the second precharging may be conducted in 2000 us or less, or 1500 us or less, such as about 1200 μs, while the first precharging may be conducted in about 5-11 seconds such as about 8 seconds.

With embodiments, after the second precharging is complete, the controller 60 may maintain the switch 52 in a closed position, and then the load 62 may be activated. The controller 60 may maintain the switch 52 in the closed position when the load 62 is active.

This disclosure includes, without limitation, the following embodiments:

1. A system, comprising: a power source; a capacitor electrically connected to the power source; a precharge circuit electrically connected between the power source and the capacitor, the precharge circuit including a switch connected in parallel with a resistor; and a controller electrically connected to the power source and the precharge circuit; wherein the controller conducts a first precharging of the capacitor to a first voltage via the resistor; and the controller conducts a second precharging of the capacitor from the first voltage to a second voltage via the switch.
2. The system of embodiment 1, including one or more sensors electrically connected between the precharge circuit and the capacitor.
3. The system of any preceding embodiment, wherein the one or more sensors are connected to ground; and the one or more sensors and the resistor act as a voltage divider during the first precharging that causes the first voltage to be less than the second voltage.

4. The system of any preceding embodiment, wherein the second precharging includes providing a PWM signal to the switch to selectively close the switch; and the PWM signal includes a plurality of different periods.
5. The system of any preceding embodiment, wherein the plurality of periods include a first period, a second period, a third period, and a fourth period.
6. The system of any preceding embodiment, wherein the fourth period is longer than the first period, the second period, and the third period; and the third period is longer than the first period and the second period.
7. The system of any preceding embodiment, wherein the fourth period is at least five times longer than the first period and the second period.
8. The system of any preceding embodiment, wherein the second period is shorter than the first period.
9. The system of any preceding embodiment, wherein the plurality of periods are 5 us or less.
10. The system of any preceding embodiment, wherein the first period and the second period are 1 us or less.
11. The system of any preceding embodiment, wherein the PWM signal includes a duty cycle of 60% or less.
12. The system of any preceding embodiment, wherein the PWM signal includes the first period for a first duration, the second period for a second duration, the third period for a third duration, and the fourth period for a fourth duration.
13. The system of any preceding embodiment, wherein the first duration is shorter than the fourth duration.
14. The system of any preceding embodiment, wherein the first duration, the second duration, the third duration, and the fourth duration are 500 us or less.
15. The system of any preceding embodiment, wherein the second precharging is conducted in 2000 us or less.
16. The system of any preceding embodiment, wherein the first precharging is conducted in 5 seconds to 11 seconds.
17. The system of any preceding embodiment, wherein the power source provides a voltage of at least 200 V; and the second voltage corresponds to the voltage of the power source.
18. The system of any preceding embodiment, wherein a difference between the first voltage and the second voltage is 5% to 15% of the second voltage.
19. A vehicle, including the system of any preceding embodiment.
20. A method of operating the system of any preceding embodiment, the method comprising: conducting the first precharging of the capacitor to the first voltage via the resistor; and conducting the second precharging of the capacitor from the first voltage to the second voltage via the switch to minimize current peaks.

In examples, a controller (e.g., the controller 60) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises." and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

It should be understood that a controller, a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A system, comprising:
    a power source;
    a capacitor electrically connected to the power source;
    a precharge circuit electrically connected between the power source and the capacitor, the precharge circuit including a switch connected in parallel with a resistor;
    one or more sensors electrically connected between the precharge circuit and the capacitor; and
    a controller electrically connected to the power source and the precharge circuit, the controller configured to implement different precharges of the capacitor to different voltages;
    wherein the controller conducts a first precharging of the capacitor to a first voltage via the resistor; and
    the controller conducts a second precharging of the capacitor from the first voltage to second voltage via the switch, wherein the one or more sensors enables the second voltage at second precharging to be greater than the first voltage at first precharging.

2. The system of claim 1, wherein the one or more sensors are connected to ground; and
    the one or more sensors and the resistor act as a voltage divider during the first precharging.

3. The system of claim 1, wherein the second precharging includes providing a PWM signal to the switch to selectively open and close the switch, wherein the controller is configured to compensate for a voltage difference between the first voltage and the second voltage, and wherein the PWM signal includes a plurality of different periods.

4. The system of claim 3, wherein the plurality of different periods include a first period, a second period, a third period, and a fourth period.

5. The system of claim 4, wherein the fourth period is longer than the first period, the second period, and the third period, and the third period is longer than the first period and the second period.

6. The system of claim 4, wherein the fourth period is at least five times longer than the first period and the second period.

7. The system of claim 4, wherein the second period is shorter than the first period.

8. The system of claim 4, wherein the plurality of periods are 5 us or less.

9. The system of claim 4, wherein the first period and the second period are 1 us or less.

10. The system of claim 4, wherein the PWM signal further includes a duty cycle of 60% or less.

11. The system of claim 4, wherein the PWM signal further includes the first period for a first duration, the second period for a second duration, the third period for a third duration, and the fourth period for a fourth duration.

12. The system of claim 11, wherein the first duration is shorter than the fourth duration.

13. The system of claim 11, wherein the first duration, the second duration, the third duration, and the fourth duration are 500 μs or less.

14. The system of claim 1, wherein the second precharging is conducted in 2000 μs or less.

15. The system of claim 14, wherein the first precharging is conducted in 5 seconds to 11 seconds.

16. The system of claim 1, wherein the power source provides a voltage of at least 200 V, and wherein the second voltage corresponds to a maximum voltage of the power source.

17. The system of claim 1, wherein a difference between the first voltage and the second voltage is 5% to 15% of the second voltage.

18. A vehicle, including the system of claim 1.

19. A method of operating the system of claim 1, the method comprising:
   conducting the first precharging of the capacitor to the first voltage via the resistor; and
   conducting the second precharging of the capacitor from the first voltage to the second voltage via the switch to minimize current peaks.

\* \* \* \* \*